(12) United States Patent
Zimmermann

(10) Patent No.: US 8,332,868 B2
(45) Date of Patent: Dec. 11, 2012

(54) PERIOD GENERATION TOOLSET

(75) Inventor: Tobias Zimmermann, Pfinztal (DE)

(73) Assignee: SAP AG, Walldorf (DE)

( * ) Notice: Subject to any disclaimer, the term of this patent is extended or adjusted under 35 U.S.C. 154(b) by 325 days.

(21) Appl. No.: 12/847,124

(22) Filed: Jul. 30, 2010

(65) Prior Publication Data

US 2012/0030688 A1 Feb. 2, 2012

(51) Int. Cl.
*G06F 9/44* (2006.01)
(52) U.S. Cl. ........................................ 719/313
(58) Field of Classification Search ................ 719/310, 719/311, 312, 313
See application file for complete search history.

(56) References Cited

U.S. PATENT DOCUMENTS

| | | | |
|---|---|---|---|
| 6,735,541 B2 * | 5/2004 | Kern et al. ................. | 702/84 |
| 7,236,843 B1 * | 6/2007 | Wizelman et al. ........... | 700/100 |
| 2002/0026369 A1 * | 2/2002 | Miller et al. ................. | 705/26 |
| 2012/0010893 A1 * | 1/2012 | Tafazzoli-Yazdi et al. .... | 705/1.1 |

* cited by examiner

*Primary Examiner* — Van Nguyen

(57) ABSTRACT

Methods, systems, and program products for generating time periods and/or due dates are provided. One method comprises providing a period toolset that is accessible by a calling program to perform a plurality of functions performed during runtime. The functions include defining a plurality of period types based on a period duration selected by the calling program. The functions further include generating a first period stream based on one of the period types. The functions further include mapping the first period stream to a second period stream based on one or more mapping rules selected by the calling program. The functions further include determining a due date for one or more periods of at least one of the first period stream and the second period stream based on one or more due date rules selected by the calling program.

20 Claims, 14 Drawing Sheets

Maintain Period Types

| Period Type | Base Unit | | Factor | Source Period | Destination Period | Flexible | Description |
|---|---|---|---|---|---|---|---|
| | | 352 | 354 | 356 | 358 | 359 | 360 |
| P100 | 1 Day | ▶ | 1 | ✓ | ✓ | | Daily |
| P200 | 2 Week | ▶ | 1 | ✓ | ✓ | ✓ | Weekly |
| P300 | 3 Month | ▶ | 1 | ✓ | ✓ | ✓ | Monthly |
| P201 | 2 Week | ▶ | 2 | ✓ | ✓ | | 2-Weekly |
| P202 | 2 Week | ▶ | 4 | ✓ | ✓ | | 4-Weekly |
| P301 | 3 Month | ▶ | 3 | | ✓ | | Quarterly |
| P302 | 3 Month | ▶ | 6 | | ✓ | | Half-Yearly |
| P400 | 3 Month | ▶ | 12 | | | | Daily |
| | 1 Day | | | | | | |
| | 2 Week | | | | | | |
| | 3 Month | | | | | | |

Weekly
| Source Period Begin | Source Period End |
|---|---|
| 05.24.2010 | 06.20.2010 |
| 06.21.2010 | 07.18.2010 |
| 07.19.2010 | 08.15.2010 |
| 08.16.2010 | 09.12.2010 |
| 09.13.2010 | 10.10.2010 |
| 10.11.2010 | 11.07.2010 |
| 11.08.2010 | 12.05.2010 |
| 12.06.2010 | 01.02.2011 |
| 01.03.2011 | 01.30.2011 |
| 01.31.2011 | 02.27.2011 |

Quarterly (3-Monthly)
| Source Period Begin | Source Period End |
|---|---|
| 04.01.2010 | 06.30.2010 |
| 07.01.2010 | 09.30.2010 |
| 10.01.2010 | 12.31.2010 |
| 01.01.2011 | 03.31.2011 |
| 04.01.2011 | 06.30.2011 |
| 07.01.2011 | 09.30.2011 |
| 10.01.2011 | 12.31.2011 |
| 01.01.2012 | 03.31.2012 |
| 04.01.2012 | 06.30.2012 |
| 07.01.2012 | 09.30.2012 |

Weekly
| Source Period Begin — 470 | Source Period End — 475 |
|---|---|
| 05.24.2010 | 05.30.2010 |
| 05.31.2010 | 06.06.2010 |
| 06.07.2010 | 06.13.2010 |
| 06.14.2010 | 06.20.2010 |
| 06.21.2010 | 06.27.2010 |
| 06.28.2010 | 07.04.2010 |
| 07.05.2010 | 07.11.2010 |
| 07.12.2010 | 07.18.2010 |
| 07.19.2010 | 07.25.2010 |
| 07.26.2010 | 08.01.2010 |

Monthly
| Source Period Begin | Source Period End |
|---|---|
| 05.01.2010 | 05.31.2010 |
| 06.01.2010 | 06.30.2010 |
| 07.01.2010 | 07.31.2010 |
| 08.01.2010 | 08.31.2010 |
| 09.01.2010 | 09.30.2010 |
| 10.01.2010 | 10.31.2010 |
| 11.01.2010 | 11.30.2010 |
| 12.01.2010 | 12.31.2010 |
| 01.01.2011 | 01.31.2011 |
| 02.01.2011 | 02.28.2011 |

FIG. 4D

Maintain Period Mapping Types

| Type | Source Type | Destination Type | Mapping Rule | Description |
|---|---|---|---|---|
| M1 | P100 Daily | P100 Daily | | Daily to Daily (no mapping required) |
| M2 | P100 Daily | P200 Weekly | | Daily to Weekly |
| M3 | P300 Monthly | P300 Monthly | | Monthly to Monthly (no mapping required) |
| M4 | P200 Weekly | P200 Weekly | | Weekly to Weekly (no mapping required) |
| M5 | P200 Weekly | P300 Monthly | BOP 1st Day | Weekly to Monthly (1st weekday overlaps) |
| M6 | P200 Weekly | P300 Monthly | EOP Last Day | Weekly to Monthly (last weekday overlaps) |
| M7 | P201 2-Weekly | P300 Monthly | EOP Last Day | 2-Weekly to Monthly |
| M8 | P202 4-Weekly | P301 Quarterly | EOP Last Day | 4-Weekly to Quarterly |

BOP 1st Day of Entitlement Period overlaps
EOP Last Day of Entitlement Period overlaps

FIG. 5B

582 Weekly to Monthly (last day overlaps) 584      586      588      ─ 570

| Source Period Begin | Source Period End | Dest. Period Begin | Dest. Period End |
|---|---|---|---|
| 05.10.2010 | 05.16.2010 | 05.01.2010 | 05.31.2010 |
| 05.17.2010 | 05.23.2010 | 05.01.2010 | 05.31.2010 |
| 05.24.2010 | 05.30.2010 | 05.01.2010 | 05.31.2010 |
| 05.31.2010 | 06.06.2010 | 06.01.2010 | 06.30.2010 |
| 06.07.2010 | 06.13.2010 | 06.01.2010 | 06.30.2010 |
| 06.14.2010 | 06.20.2010 | 06.01.2010 | 06.30.2010 |
| 06.21.2010 | 06.27.2010 | 06.01.2010 | 06.30.2010 |
| 06.28.2010 | 07.04.2010 | 07.01.2010 | 07.31.2010 |
| 07.05.2010 | 07.11.2010 | 07.01.2010 | 07.31.2010 |
| 07.12.2010 | 07.18.2010 | 07.01.2010 | 07.31.2010 |
| 07.19.2010 | 07.25.2010 | 07.01.2010 | 07.31.2010 |
| 07.26.2010 | 08.01.2010 | 08.01.2010 | 08.31.2010 |

FIG. 5D

Weekly to Monthly (first day overlaps)      ─ 575

| Source Period Begin | Source Period End | Dest. Period Begin | Dest. Period End |
|---|---|---|---|
| 05.10.2010 | 05.16.2010 | 05.01.2010 | 05.31.2010 |
| 05.17.2010 | 05.23.2010 | 05.01.2010 | 05.31.2010 |
| 05.24.2010 | 05.30.2010 | 05.01.2010 | 05.31.2010 |
| 05.31.2010 | 06.06.2010 | 05.01.2010 | 05.31.2010 |
| 06.07.2010 | 06.13.2010 | 06.01.2010 | 06.30.2010 |
| 06.14.2010 | 06.20.2010 | 06.01.2010 | 06.30.2010 |
| 06.21.2010 | 06.27.2010 | 06.01.2010 | 06.30.2010 |
| 06.28.2010 | 07.04.2010 | 06.01.2010 | 06.30.2010 |
| 07.05.2010 | 07.11.2010 | 07.01.2010 | 07.31.2010 |
| 07.12.2010 | 07.18.2010 | 07.01.2010 | 07.31.2010 |
| 07.19.2010 | 07.25.2010 | 07.01.2010 | 07.31.2010 |
| 07.26.2010 | 08.01.2010 | 07.01.2010 | 07.31.2010 |

FIG. 5E

2-Weekly to Monthly (last day overlaps)      ─ 580

| Source Period Begin | Source Period End | Dest. Period Begin | Dest. Period End |
|---|---|---|---|
| 05.10.2010 | 05.23.2010 | 05.01.2010 | 05.31.2010 |
| 05.24.2010 | 06.06.2010 | 06.01.2010 | 06.30.2010 |
| 06.07.2010 | 06.20.2010 | 06.01.2010 | 06.30.2010 |
| 06.21.2010 | 07.05.2010 | 07.01.2010 | 07.31.2010 |
| 07.05.2010 | 07.19.2010 | 07.01.2010 | 07.31.2010 |
| 07.19.2010 | 08.01.2010 | 08.01.2010 | 08.31.2010 |
| 08.02.2010 | 08.15.2010 | 08.01.2010 | 08.31.2010 |
| 08.16.2010 | 08.29.2010 | 08.01.2010 | 08.31.2010 |
| 08.30.2010 | 09.12.2010 | 09.01.2010 | 09.30.2010 |
| 09.13.2010 | 09.26.2010 | 09.01.2010 | 09.30.2010 |
| 09.27.2010 | 10.10.2010 | 10.01.2010 | 10.31.2010 |
| 10.11.2010 | 10.24.2010 | 10.01.2010 | 10.31.2010 |

FIG. 5F

Maintain Due Date Rule Types

| Due Date Rule Type | Per. Type | Base Rule | Factor | Calendar | Calendar Rule | Description |
|---|---|---|---|---|---|---|
| DD1 | F300 | BOP Begin ▶ | | | ▶ | First day in month |
| DD2 | F300 | EOP End ▶ | | | ▶ | Last day in month |
| DD3 | F300 | BOP Begin ▶ | | DK Denmark ▶ | + Mov | First day in month respecting calendar |
| DD4 | F300 | EOP End ▶ | | DK Denmark ▶ | + Mov | Last day in month respecting calendar |
| DD5 | F300 | BOP Begin ▶ | 14 | DK Denmark ▶ | + Mov | 15th day in month (1st + 14 days) |
| DD6 | F300 | EOP End ▶ | -4 | | ▶ | Last day in month -4 days |
| DD7 | F200 | BOP Begin ▶ | -4 | DK Denmark ▶ | + Mov | 1st day of in week -4 days resp. Fact. C |
| DD8 | F200 | EOP End ▶ | | | ▶ | Last day in week |
| DD9 | F300 | ZOP Wed. ▶ | | | ▶ | Wednesday in 2nd week of next month |

FIG. 6B

| Source Period Begin | Source Period End | Dest. Period Begin | Dest. Period End | Due Date |
|---|---|---|---|---|
| 05.24.2010 | 05.30.2010 | 05.01.2010 | 05.31.2010 | 05.27.2010 |
| 05.31.2010 | 06.06.2010 | 06.01.2010 | 06.30.2010 | 06.28.2010 |
| 06.07.2010 | 06.13.2010 | 06.01.2010 | 06.30.2010 | 06.28.2010 |
| 06.14.2010 | 06.20.2010 | 06.01.2010 | 06.30.2010 | 06.28.2010 |
| 06.21.2010 | 06.27.2010 | 06.01.2010 | 06.30.2010 | 06.28.2010 |
| 06.28.2010 | 07.04.2010 | 07.01.2010 | 07.31.2010 | 07.27.2010 |
| 07.05.2010 | 07.11.2010 | 07.01.2010 | 07.31.2010 | 07.27.2010 |
| 07.12.2010 | 07.18.2010 | 07.01.2010 | 07.31.2010 | 07.27.2010 |
| 07.19.2010 | 07.25.2010 | 07.01.2010 | 07.31.2010 | 07.27.2010 |
| 07.26.2010 | 08.01.2010 | 08.01.2010 | 08.31.2010 | 08.27.2010 |
| 08.02.2010 | 08.08.2010 | 08.01.2010 | 08.31.2010 | 08.27.2010 |
| 08.09.2010 | 08.15.2010 | 08.01.2010 | 08.31.2010 | 08.27.2010 |

FIG. 6D

PERIOD GENERATION TOOLSET

BACKGROUND

The present disclosure relates generally to the field of computing systems. More particularly, the present disclosure relates to the creation of time periods for use by one or more modules in a computing system.

Computing systems (e.g., computer hardware and/or software) may utilize and/or reference time periods to perform a variety of functions. For example, a system may be configured to determine one or more schedules based upon which payments should be made (e.g., to an individual, entity, etc.). Such a system may be configured to determine one or more time periods in which work is performed and determine the schedule for payments based upon the periods in which the work is performed. Traditionally, the periods in which work is performed and/or the schedule(s) based upon which payments are made may be determined during design of the system and may not be changed by a user of the system (e.g., may be static).

SUMMARY

According to one embodiment of the present disclosure, a method of generating time periods and due dates comprises providing a period toolset that is accessible by a calling program to perform a plurality of functions. The function are performed during runtime of the calling program. The period toolset and the calling program are implemented via instructions that are executable by one or more processors and stored on one or more computer-readable media. The functions include defining, using a period generation module, a plurality of period types based on a period duration selected by the calling program. The functions further include generating, using the period generation module, a first period stream based on one of the period types. The first period stream is based on a beginning date and an ending date selected by the calling program. The first period stream is a group of periods occurring between the beginning date and the ending date of the first period stream. The functions further include mapping, using a period mapping module, the first period stream to a second period stream based on one or more mapping rules selected by the calling program. Mapping the first period stream to the second period stream comprises mapping each period of the first period stream to at least one period of the second period stream. At least one of the one or more mapping rules determines a period of the second period stream to which an overlapping period of the first period stream should be mapped when the overlapping period overlaps two periods of the second period stream. The functions further include determining, using a due date generation module, a due date for one or more periods of at least one of the first period stream and the second period stream based on one or more due date rules selected by the calling program. The one or more due date rules are configured to determine a date on which a due date will occur for each period to which the due date rule is applied. The period generation module, period mapping module, and due date generation module are implemented via instructions that are executable by the one or more processors and stored on the one or more computer-readable media.

According to another embodiment of the present disclosure, a system for generating time periods and due dates comprises one or more processors and one or more computer-readable media having instructions stored thereon. The instructions are executable by the one or more processors to implement a period toolset. The period toolset is accessible by a calling program to enable the calling program to define a plurality of period types based on a period duration selected by the calling program. The period toolset further enables the calling program to generate a first period stream based on one of the period types. The first period stream is based on a beginning date and an ending date selected by the calling program. The first period stream is a group of periods occurring between the beginning date and the ending date of the first period stream. The period toolset further enables the calling program to map the first period stream to a second period stream based on one or more mapping rules selected by the calling program. Mapping the first period stream to the second period stream comprises mapping each period of the first period stream to at least one period of the second period stream. At least one of the one or more mapping rules determines a period of the second period stream to which an overlapping period of the first period stream should be mapped when the overlapping period overlaps two periods of the second period stream. The period toolset further enables the calling program to define at least one due date rule configured to determine a date on which a due date will occur for each period to which the due date rule is applied. The period toolset further enables the calling program to apply the due date rule to a period stream to determine a due date for each period associated with the period stream. The period toolset is configured to enable the calling program to define the plurality of period types, generate the first period stream, map the first period stream to the second period stream, define the due date rule, and apply the due date rule to a period stream during runtime of the calling program.

According to yet another embodiment of the present disclosure, a program product comprises one or more non-transitory computer-readable media having instructions stored thereon. The instructions are executable by one or more processors to implement a method of generating time periods and due dates. The method comprises providing a period toolset that is accessible by a calling program to perform a plurality of functions. The functions are performed during runtime of the calling program. The period toolset and the calling program are implemented via instructions that are executable by one or more processors and stored on one or more computer-readable media. The functions include defining a plurality of period types based on a period duration selected by the calling program. The functions further include generating a first period stream based on one of the period types. The first period stream is based on a beginning date and an ending date selected by the calling program. The first period stream is a group of periods occurring between the beginning date and the ending date of the first period stream. The functions further include mapping the first period stream to a second period stream based on one or more mapping rules selected by the calling program. Mapping the first period stream to the second period stream comprises mapping each period of the first period stream to at least one period of the second period stream. At least one of the one or more mapping rules determines a period of the second period stream to which an overlapping period of the first period stream should be mapped when the overlapping period overlaps two periods of the second period stream. A first mapping rule causes the overlapping period of the first period stream to be mapped to a period of the second period stream that overlaps a first day of the overlapping period. A second mapping rule causes the overlapping period of the first period stream to be mapped to a period of the second period stream that overlaps a last day of the overlapping period. The period toolset is configured to enable the calling program to select one of the first mapping rule and the second mapping rule to apply in mapping the first period stream to the second period stream. The functions further include defining one or more due date rules configured to determine a date on which a due date will occur for each period to which the due date rule is applied. The period toolset is configured to enable the calling program to associate at least one of the one or more due date rules with a calendar. The calendar includes a plurality of special dates. The due date rule is configured to move the due date when the determined date on which the due date will occur is one of the plurality of special dates. The functions further include applying the due date rule to a period stream to determine a due date for each period associated with the period stream.

BRIEF DESCRIPTION OF THE DRAWINGS

FIG. 3B is an illustration of a user interface that may be used in defining one or more period types according to an exemplary embodiment.

FIGS. 4B through 4E are tables illustrating period streams that may be generated based on different period types according to exemplary embodiments.

FIG. 5B is an illustration of a user interface that may be used in mapping a source period to a destination period according to an exemplary embodiment.

FIGS. 5D through 5F are tables illustrating mapping of periods from a source period type to a destination period type according to exemplary embodiments.

FIG. 6B is an illustration of a user interface that may be used defining one or more due date rules according to an exemplary embodiment.

FIG. 6D is a table illustrating mapping of periods from a source period to a destination period and due dates determined based on one due date rule according to an exemplary embodiment.

DETAILED DESCRIPTION

Referring generally to the figures, systems and methods that may be used in generating and utilizing time periods and/or due dates are described according to various exemplary embodiments. The time periods and/or due dates may be used in conjunction with various different applications. For example, in one embodiment, periods and/or due dates may be used to schedule salary and/or benefits payments as part of a human resources management system. Different periods may be generated to represent entitlement periods (e.g., periods in which an employee has earned pay and/or benefits) and payment periods (e.g., periods relating to a company's payment cycle).

According to various embodiments, the systems and methods described in the present disclosure may be used to perform (e.g., dynamically) various generation and management functions related to time periods and/or due dates. The systems and methods may be implemented in a period toolset (e.g. a function library) that may be utilized by a program (e.g., via function calls) and/or a user (e.g., in a configuration mode) to dynamically define (e.g., during runtime of a program calling and/or utilizing the period toolset) periods and/or due dates. By enabling a program and/or user to dynamically define features related to the period toolset (e.g., period types, period streams, period mapping, due dates, etc.), newly defined time periods and/or due dates may be established without the need for the time periods and/or due dates to be predefined or preprogrammed during design of the period toolset. One or more period types (e.g., one or more period types related to an entitlement period, payment period, etc.) may be defined based on a duration. A period stream (e.g., a set of periods between a beginning date and an ending date, such as a set of entitlement periods and/or payment periods) may be generated based on a selected period type. A source period (e.g., an entitlement period) may be mapped to a destination period (e.g., a payment period) based on mapping rules. One or more due date rules may be defined and/or one or more due dates may be associated with a period based on due date rules.

Figure 1:
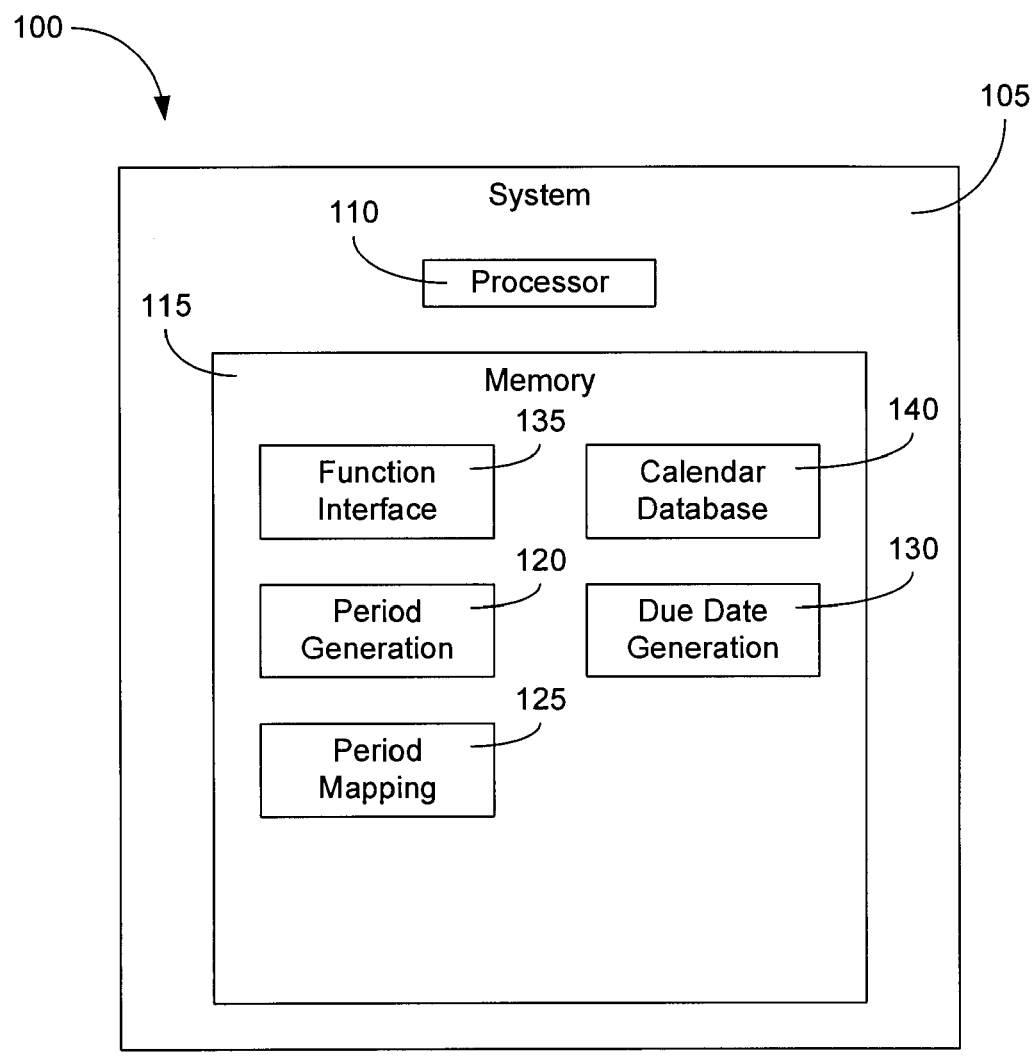
FIG. 1 is a block diagram of a system for generating time periods according to an exemplary embodiment.

Referring now to FIG. 1, a block diagram of a system 100 for generating time periods and/or due dates is shown according to an exemplary embodiment. System 100 may be any type of computing system and includes a processor 110 and a memory 115 (e.g., any computer-readable medium). Memory 115 is configured to store modules that may be configured to perform various functions relating to generating and/or managing time periods and/or due dates. In the illustrated exemplary embodiment, the modules stored in memory 115 include a period generation module 120, a period mapping module 125, and a due date generation module 130.

Period generation module 120 is configured to define time periods and/or generate period streams based on defined periods. In some embodiments, period generation module 120 may work in conjunction with a function interface 135 to allow a program to define a new type of period and/or modify an existing type of period. A program may select (e.g., for period types that have been predefined) or define a period type having a duration that is a base unit of time (e.g., a daily, weekly, monthly, yearly, etc. duration). The program may also select or define a period type having a duration that is not a base unit, such as a duration that is a multiple of a base unit (e.g., a 3-daily, 2-weekly, 4-weekly, 3-monthly or quarterly, etc. duration). In some embodiments, the program may identify one or more period applications to which the period types may be applied (e.g., entitlement periods, payment periods, etc.).

In some embodiments, period generation module 120 may be used to generate period streams based on a selected period type. The program may select a period type to be used in generating the period stream. For example, the program may select a weekly period type, and period generation module 120 may generate a period stream including weekly periods. In one embodiment, the period stream may begin at a current date and end a predetermined time (e.g., one year) in the future. In another embodiment, the program may specify a desired beginning and ending date for the period stream. For example, the program may select a weekly period type, a beginning date of Aug. 1, 2010, and an ending date of Dec. 1, 2010, and period generation module 120 may be configured to generate a period stream including all weekly periods between Aug. 1, 2010 and Dec. 1, 2010.

Period mapping module 125 is configured to map one type of period stream (e.g., a source period stream) to another type of period stream (e.g., a destination period stream). Mapping source periods to destination periods allows a program (e.g., a payment system) to define a relationship between two different periods streams, such as an entitlement period stream in which an employee earns entitlement to payment (e.g., a salary) and a payment period stream in which a company provides payments to its employees. For example, a program may map a weekly source period stream (e.g., an entitlement period stream) to a monthly destination period stream (e.g., payment periods). The program may select (e.g., via function interface 135) the weekly source period type and the monthly destination period type. In some embodiments, the calling program may also select a mapping rule that may be used by period mapping module 125 to determine how the source periods are mapped to the destination periods. For example, for source periods that overlap with multiple destination periods (e.g., a week that falls between two months), the program may select a rule that defines the destination period (e.g., the month) to which the overlapping source period is mapped. Period mapping module 125 may generate a mapping relationship between the source periods and the destination periods based on the selections.

Due date generation module 130 is configured to define due date rules that determine one or more due dates associated with a period stream and/or allow a program to select a due date rule to apply to a particular period stream. For example, a due date applied to a payment period stream may represent a date upon which a payment should be made. Due date generation module 130 may allow a calling program to define a rule specifying a day of the period stream on which the due date should occur. In some embodiments, the day of the period stream may be specified with reference to a particular day of the period stream, such as the first day or the last day of the period stream. For example, in one embodiment, a due date rule may specify that a due date should fall four days before the end of a destination period (e.g., for a payment period, to allow time for the bank to transfer payment).

Due date generation module 130 may allow a program to define a due date rule based on one or more calendars (e.g., stored in a calendar database 140). A rule may be based in part on one or more calendars specific to a country, region, company, business unit, etc. of interest for a particular application. For example, a country-specific calendar may contain data relating to national holidays for a specific country. A company-specific calendar may contain data relating to company holidays and/or downtimes (e.g., days on which the company is not conducting business, a factory is not operating, etc.). In some embodiments, a due date rule may define an action to be taken if the base conditions of the rule would cause the due date to fall on a special type of day (e.g., a weekend, a national and/or company holiday, etc.), such as moving the due date to the previous or next normal business day.

In some embodiments, such as in a configuration mode, function interface 135 may be used directly by a user (e.g., in conjunction with a user interface) to select and/or define various features in the period tool. For example, a user may use function interface 135 to define one or more user-defined period types. In some embodiments, a user may define one or more mapping rules and/or due date rules. In various embodiments, any features described herein as being configurable and/or definable by a calling program may additionally or alternatively be defined by a user via function interface 135.

Figure 2:
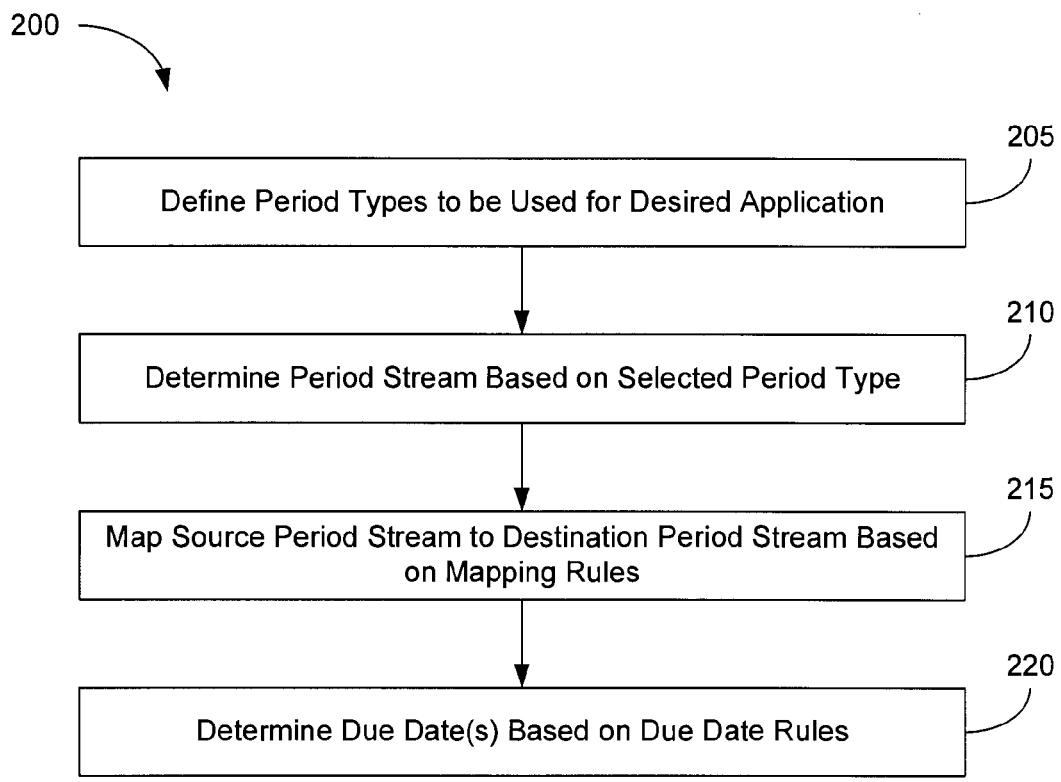
FIG. 2 is a flow diagram of a process for generating and managing time periods and due dates according to an exemplary embodiment.

Referring now to FIG. 2, a flow diagram of a process 200 for generating and managing time periods and due dates is shown according to an exemplary embodiment. In various embodiments, process 200 may be executed using a system such as system 100. Process 200 may be used to generate period types and/or period streams, map period streams to one another, and/or determine due dates associated with period streams.

Process 200 may be used (e.g., by a period generation module such as period generation module 120) to generate or define period types for use with one or more desired applications (step 205). The period types may be predefined and/or generated dynamically. For example, in some embodiments, several standard or basic period types (e.g., having a daily, weekly, monthly, etc. duration) may be predefined and a program may be allowed to define other period types (e.g., having a 2-weekly, quarterly, semi-annual, etc. duration). Non-standard period types, or period types with a duration that is not a base unit of time (e.g., day, week, month, etc.), may be defined based on a base unit of time and a factor or multiplier. For example, a bi-weekly period may be based on a base unit of a week and a factor of two. A semi-annual period may be based on a base unit of a month and a factor of six or a base unit of a year and a factor of one-half. A period may be defined as having any length of duration; in various embodiments, a period may be defined as having a duration of 73 minutes, 9 hours, 5 days, 23 days, 7 months, or any other length. In some embodiments, a period type may be associated with and/or defined as eligible for one or more types of applications. For example, a payment system may include entitlement periods and payment periods, and a user may be enabled to define each period type as being usable with one or both of the entitlement periods and payment periods. Generation of period types is discussed in greater detail herein with respect to FIGS. 3A and 3B according to exemplary embodiments.

Process 200 may also be used (e.g., by a period generation module such as period generation module 120) to generate a period stream based on one of the defined period types (step 210). A period stream is a group (e.g., set or list) of periods occurring between two dates. A period stream may be generated based on a selected period type, a beginning date, and a duration or ending date. The period stream may be structured to include all periods occurring between the beginning date and the ending date. For example, if a period type having a four day duration is selected and a beginning date of Oct. 6, 2010 and ending date of Nov. 2, 2010 are chosen, the period stream generated may include a set of all four day periods falling between Oct. 6, 2010 and Nov. 2, 2010. Generation of period streams is discussed in greater detail herein with respect to FIGS. 4A through 4E according to exemplary embodiments.

Process 200 may also be used (e.g., by a period mapping module such as period mapping module 125) to map one period stream to another period stream (step 215). For example, for a payment system, a period stream representing entitlement periods may be mapped to a period stream representing payment periods. A program may be enabled (e.g., via a function interface) to select a source period type and a destination period type from among the defined period types. In some embodiments, the source and destination periods may have the same type and/or duration and mapping may not be required. In other embodiments, the source period type (e.g., having a weekly duration) may have a different duration than the destination period type (e.g., having a monthly duration) and mapping may be required. In various embodiment, several source periods may be mapped to each destination period (e.g., for a weekly to monthly mapping) or each source period may be mapped to several destination periods (e.g., for a monthly to weekly mapping). In some embodiments, each mapping category or type may be defined based in part on a mapping rule that determines how overlapping periods are mapped. For example, for a weekly to monthly mapping, one mapping rule (e.g., a beginning of period mapping rule) may dictate that a week that overlaps two months will be mapped to the month with which the first day of the week overlaps. Another mapping rule (e.g., an end of period mapping rule) may dictate that a week that overlaps two months will be mapped to the month with which the last day of the week overlaps. Mapping of periods is discussed in greater detail herein with respect to FIGS. 5A through 5F according to exemplary embodiments.

Process 200 may also be used (e.g., by a due date generation module such as due date generation module 130) to generate one or more due date rules and/or determine one or more due dates associated with a period stream (step 220). For example, for a payment system, one or more due dates may be generated for each payment period or payment stream representing dates on which payments should be made. In some embodiments, a due date rule may be defined based on a period type associated with the due date rule. A due date rule may also be defined based on a base due date rule. In various embodiments, a base due date rule may include a beginning of period rule under which a due date may fall on the first day of each period, an ending of period rule under which the due date may fall on the last day of each period, a middle of period rule under which the due date may fall on a middle day of each period, or another type of base due date rule. In some embodiments, a due date rule may be further defined based on a factor to the base due date rule. The factor may represent a time interval (e.g., days, weeks, etc.) by which the due date should be shifted from the date established under the base due date rule. For example, a factor of eleven to an ending of period base rule may cause the due date to be shifted eleven days forward from the last day of the period, and a factor of negative four may cause the due date to be shifted four days back from the last day of the period.

In some embodiments, a due date rule may be defined based on one or more calendars, such as a calendar specific to a country, region, company, business unit, factory, etc. Each calendar may contain data relating to one or more special types of days (e.g., weekends, national or company holidays, scheduled factor downtimes, etc.), such as days on which normal business will not be conducted. In some embodiments, a due date rule may include a calendar rule specifying an adjustment to a due date established according to the base due date rule and/or modifier when the due date rule falls on one of the special days. For example, a calendar rule may specify that the due date should be moved forward to the next normal or non-special day (e.g., business day) under the calendar, moved back to the previous normal day, moved forward or back by a set number of days, etc.

At step 220, process 200 may be used to apply a predefined and/or user-defined due date rule to one or more period streams. In one embodiment, a program may be enabled to select from among any predefined due date rules and/or custom (e.g., dynamically defined) due date rules to apply to a period stream to establish a due date. In another embodiment, a program may be restricted to selecting from among due date rules that have been identified as applying to the period stream to which the rule is being applied. Once selected, the due date rule may be used to determine one or more due dates associated with periods in the period stream. Definition of due date rules and/or application of rules to determine due dates is discussed in greater detail herein with reference to FIGS. 6A through 6D according to exemplary embodiments.

Figure 3A:
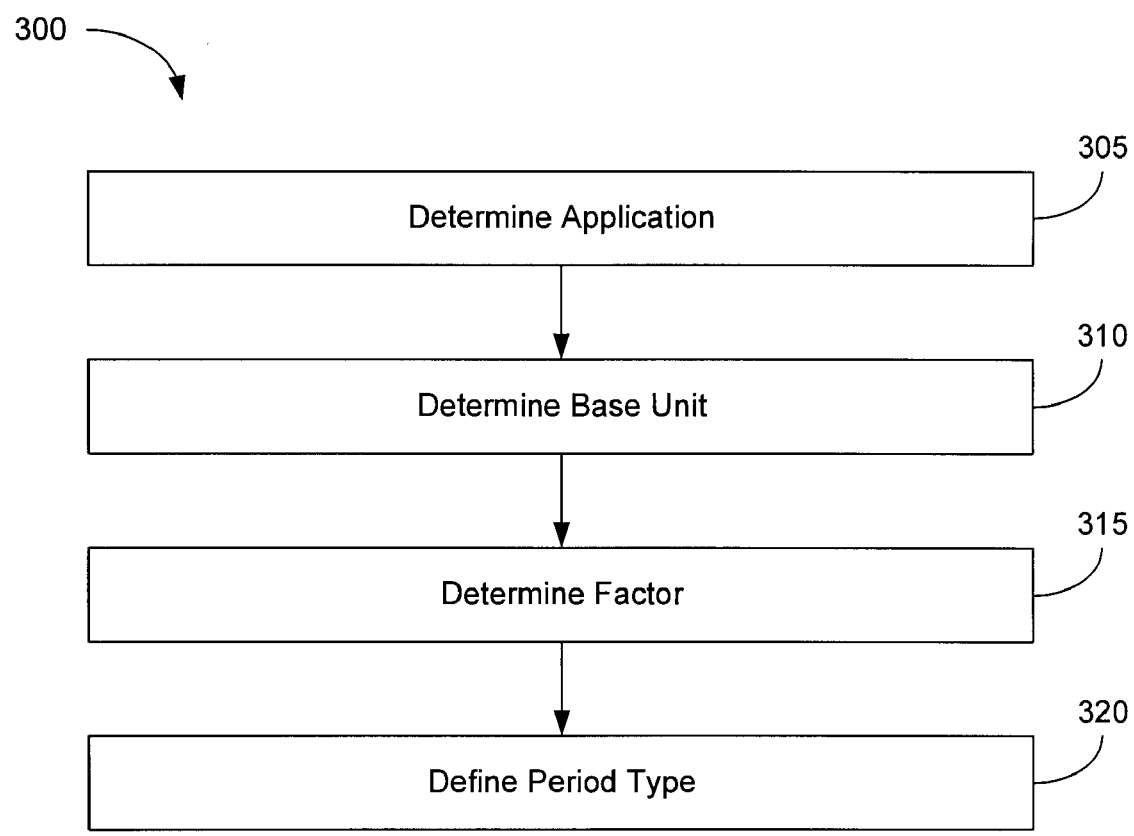
FIG. 3A is a flow diagram of a process for defining a period type according to an exemplary embodiment.

Referring now to FIG. 3A, a flow diagram of a process 300 for defining a period type is shown according to an exemplary embodiment. At step 305, the system may be configured to determine an application with which the period type may be associated. In some embodiments, an application with which the period type is associated may be determined by a default setting. In other embodiments, a program may specify the application with which the period type may be associated.

At step 310, a base unit for the period type may be determined. The base unit may be a basic temporal unit such as a day, week, month, year, etc. The basic unit may also be any other unit of time. At step 315, a factor or multiplier associated with the period type may be determined. A duration associated with the period type may be determined based on the product of the base unit and the factor. In some embodiments, the duration associated with the period type may be a base unit and the factor may be equal to one. In other embodiments, the duration associated with the period type may not be a base unit and the factor may be less than or greater than one. For example, for a quarterly duration, a base unit of a month may be combined with a factor of three or a base unit of a year may be combined with a factor of one-quarter. At step 320, the period type may be created and defined according to the determined base unit, factor, and/or associated applications.

Referring now to FIG. 3B, an illustration of a user interface 340 that may be used in defining one or more period types (e.g., in a configuration mode) is shown according to an exemplary embodiment. User interface 340 may be used, for example, in conjunction with performing one or more steps of process 300 in relation to a payment system. In various embodiments, features and/or options shown in user interface 340 may be defined and/or selected by a program (e.g., via function calls) via a function interface. User interface 340 includes several columns, including a period type column 350, base unit column 352, factor column 354, source period column 356, destination period column 358, and description column 360. Period type column 350 contains an identifier associated with each period type. Base unit column 352 contains a base unit (e.g., day, week, or month) associated with each period type. Factor column 354 contains a factor by which the base unit is multiplied to determine the duration for each period type. Source period column 356 contains an indicator (e.g., a selectable indicator, such as a check box) identifying whether each period type may be applied to a source period. Destination period column 358 contains an indicator identifying whether each period type may be applied to a destination period. Description column 360 contains a description (e.g., a description of the duration) associated with each period type.

Several of the example period types displayed in user interface 340 have durations that are base units. Period types P100, P200, and P300 have daily, weekly, and monthly durations, respectively. Each of these period types has a factor of 1. Several other example period types, P201, P202, P301, P302, and P400, have durations that are not base units (as defined in user interface 340, where base units include days, weeks, and months). Each of these period types has a factor greater than 1.

Several of the example period types, P100, P200, P300, P201, and P202, have been selected to apply to both source periods and destination periods. Other example period types, P301 and P302, have been selected to apply to only source periods. In various embodiments, the indicators shown in columns 356 and 358 may be configured to be selectable and/or deselectable by a user to modify the period categories to which each period type applies.

In some embodiments, one or more period types may be defined as being flexible period types (e.g., as shown in flexible column 359). In some embodiments, standard period streams (e.g., non-flexible period streams) may be generated based on beginning and ending dates but aligned with a calendar. For example, a period stream based on a weekly period may have a beginning date on a Tuesday and an ending date on a Thursday, but the period stream may be defined to begin on the beginning date of a calendar week (e.g., as defined under a calendar, such as a Sunday or Monday) and end on the ending date of a calendar week (e.g., a Friday or a Saturday). In some embodiments, the period toolset may utilize one or more rules to define when a non-flexible period stream will begin and/or end when the beginning and/or ending dates do not fall on the beginning and/or ending of a calendar week (e.g., immediately preceding calendar start and/or end date, immediately following calendar start and/or end date, etc.).

Period streams generated based on flexible periods may not necessarily be aligned with a calendar. In such embodiments, flexible period streams may be defined based on the beginning and/or ending dates without regard to whether those dates fall on calendar beginning and/or ending dates. For example, a period stream based on period type P300 shown in user interface 340 may be defined as having a beginning date on May 14 and an ending date on August 13. Because P300 is a flexible period, the beginning date may be set to May 14 and the ending date may be set to August 13 (e.g., rather than, for example, a beginning date of May 1 and an ending date of July 31).

Figure 4A:
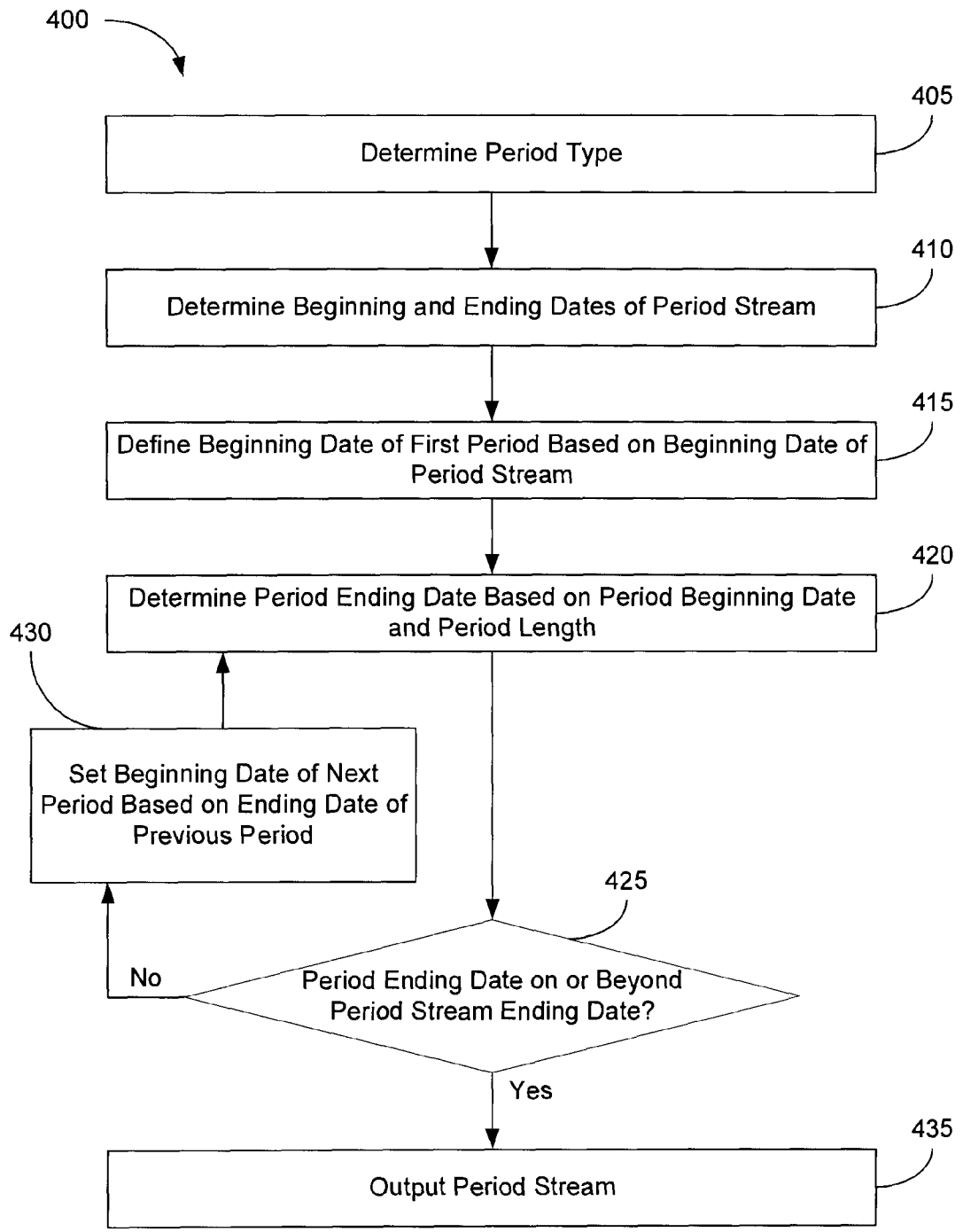
FIG. 4A is a flow diagram of a process for determining a period stream according to an exemplary embodiment.

Referring now to FIG. 4A, a flow diagram of a process 400 for determining a period stream is shown according to an exemplary embodiment. In some embodiments, process 400 may be executed on a system such as system 100 and/or a module such as period generation module 120. At step 405, the system determines (e.g., via user input, default values, etc.) a period type that should be used to generate the period stream. The period type may be a predefined period type or a customized or user-defined period type (e.g., defined using a process such as process 300) and may have a duration of any length (e.g., four day, two week, month, 3 month, etc.). At step 410, the system determines a beginning date and an ending date for the period stream. In some embodiments, the beginning date and ending date may be determined by default according to predetermined values, such as a beginning date of a current date and an ending date three months after the current date. In other embodiments, a program may provide a selection of the beginning and ending dates. In some embodiments, the period stream may have a duration of any length. In other embodiments, the system may require that the duration of the period stream be at least as long as the duration of the period type (e.g., include at least one full period) or a predetermined minimum length.

At step 415, the system defines a beginning date of the first period based on the beginning date of the period stream. In some embodiments, the beginning date of the period stream determined at step 410 may fall on the first date of the first full period. For example, a beginning date of Aug. 1, 2010 may be specified for a monthly period stream. In such embodiments, the beginning date of the first period may be determined to be the beginning date of the period stream. In other embodiments, the beginning date of the period stream may fall in the middle of a period. For example, a beginning date of Aug. 7, 2010 may be specified for a monthly period stream. In some such embodiments, the beginning date of the first period may be determined to be the same as the beginning date of the period stream and the first period in the period stream may be a partial period. In other such embodiments, the beginning date of the period stream and/or first period may be determined to be the next closest first date of a full period (e.g., Aug. 1, 2010 in the example above). In further embodiments, the beginning date of the period stream and/or first period may be determined to be the immediately earlier or immediately later first date of a full period (e.g., Aug. 1, 2010 or Sep. 1, 2010, depending on which rule is applied). In yet another embodiments, the system may require that a new period stream beginning date be selected that falls on the first date of the period. Such exemplary embodiments may also be applied in the event the ending date determined at step 410 falls in the middle of a period.

At step 420, the system determines an ending date for the first period based on the beginning date determined at step 415 and the duration of the period. For example, if the beginning date of the first period is defined to be Aug. 1, 2010 and the duration of the period is one month, the ending date of the first period is determined to be Aug. 31, 2010. At step 425, the system determines whether the ending date of the period is on or beyond the ending date of the period stream. If it is not on or beyond the ending date of the period stream, the system adds another period to the period stream and sets the beginning date of the next period based on the ending date of the previous period (e.g., one day after the ending date of the previous period) (step 430). Steps 420, 425, and/or 430 repeat until the ending date of the last period is on or beyond the ending date of the period stream. Once the ending date of the last period is on or beyond the ending date of the period stream, the system outputs (e.g., stores in memory, displays to a user, etc.) the period stream (step 435).

In some embodiments, the system may be configured to correct (e.g., automatically) the beginning and/or ending dates of a period stream if the beginning and/or ending dates would fall on a non-calendar date (i.e., a date that does not exist under a standard or defined calendar, such as September 31). For example, a monthly period stream may be defined having a beginning date of January 30 and an ending date of July 29, such that each period in the period stream runs from the 30th day of one month to the 29th day of the following month. Accordingly, the first period stream would run from January 30 to February 29. However, February 29 does not exist in all calendar years. The system may be configured to adjust the ending date of the first period to February 28 and the beginning date of the next period to March 1.

In some embodiments, the period stream may be determined based on a beginning date and a number of periods that should be included in the period stream. For example, a user may specify that a weekly period stream should begin on Jul. 11, 2010 and include eight periods. Instead of determining whether the period ending date is on or beyond the period stream ending date at step 425, the system may determine whether the required number of periods have been added to the period stream and, if not, add another period.

Referring now to FIGS. 4B through 4E, tables illustrating period streams that may be generated based on different period types are shown according to exemplary embodiments. FIG. 4B includes a table 450 illustrating a sample period stream based on a period type having a weekly duration, a beginning date of May 24, 2010, and an ending date of Aug. 1, 2010. Column 470 shows the beginning dates of each period in the period stream, and column 475 shows the ending dates of each period. Table 450 illustrates the beginning and ending dates for all weekly periods in the period stream. FIG.

4C includes a table 455 illustrating a sample period stream based on a period type having a duration of four weeks, a beginning date of May 24, 2010, and an ending date of Feb. 27, 2011. FIG. 4D includes a table 460 illustrating a sample period stream based on a period type having a monthly duration, a beginning date of May 1, 2010, and an ending date of Feb. 28, 2011. FIG. 4E includes a table 465 illustrating a sample period stream based on a period type having a quarterly duration (i.e., a duration of three months), a beginning date of Apr. 1, 2010, and an ending date of Sep. 30, 2012. As noted above, period streams of any duration and/or based on any period type may be generated using a process similar to process 400.

Figure 5A:
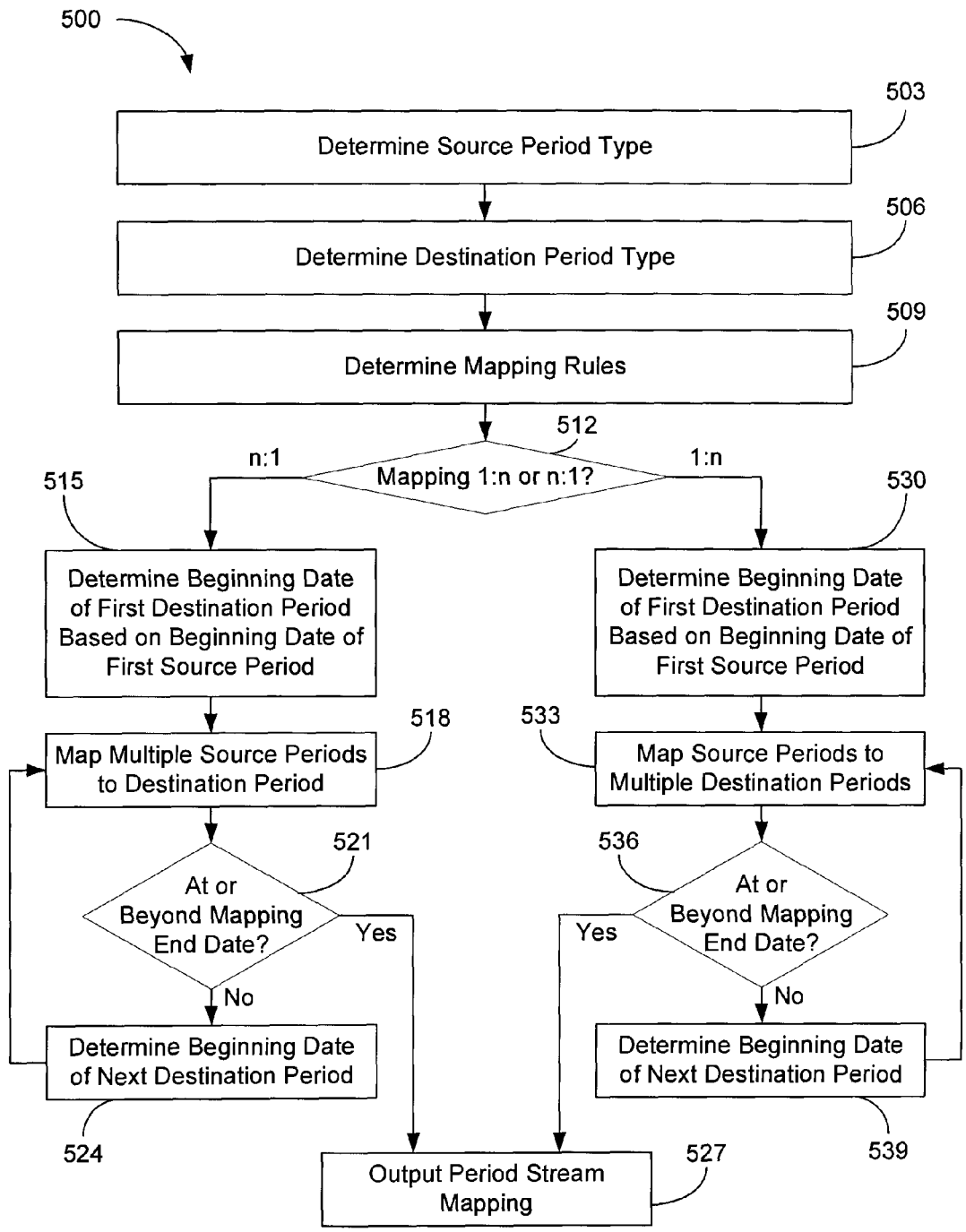
FIG. 5A is a flow diagram of a process for mapping a source period to a destination period according to an exemplary embodiment.

Referring now to FIG. 5A, a flow diagram of a process 500 for mapping a source period stream to a destination period stream is shown according to an exemplary embodiment. In some embodiments, process 500 may be executed on a system such as system 100 and/or a module such as period mapping module 125. Process 500 begins with the determination of a source period type (step 503) and a destination period type (step 506). The source period type and destination period type may be any types of periods. In some embodiments, the source period and destination period may have the same type and/or the same duration. In such embodiments, no mapping may be required and the streams may be directly matched and output (e.g., stored in memory, displayed to a user, etc.) by the system (e.g., by process 500 proceeding directly to step 527).

In other embodiments, the source period type and destination period type may not be the same, and mapping may be required. In some such embodiments, the source period type may have a shorter duration than the destination period type, requiring a many-to-one mapping of periods. For example, a weekly source period stream may be mapped to a monthly destination period stream. In other embodiments, the source period type may have a longer duration than the destination period type, requiring a one-to-many mapping of periods. For example, a monthly source period stream may be mapped to a weekly destination period stream.

At step 509, the system may determine one or more mapping rules to be used in mapping the source period stream to the destination period stream. In one embodiment, a mapping rule may determine how source periods that fall within two destination periods should be mapped. For example, a weekly period stream may have a weekly period falling between two months. One exemplary mapping rule (e.g., a beginning of period ("BOP") mapping rule) may cause the overlapping source period to be mapped to the destination period with which its first day overlaps. Another exemplary mapping rule (e.g., an ending of period ("EOP") mapping rule) may cause the overlapping source period to be mapped to the destination period with which its last day overlaps. Another exemplary mapping rule may cause the overlapping source period to be mapped to the destination period with which it overlaps to the greatest extent (e.g., by the most days) and/or with which its middle day overlaps. Yet another exemplary mapping rule may cause the overlapping source period to be mapped to the destination period with which it overlaps on a particular day of the source period (e.g., a predefined or user-selected day). Various other mapping rules may be applied in mapping the source period stream to the destination period stream, and all such variations fall within the scope of the present disclosure.

In some embodiments, a program and/or user may be enabled to define custom mapping rules to apply to one or more period types and/or mapping types. For example, the thirteenth day of each source period may be significant to a user for a particular application. In one embodiment, the program and/or user may define a rule (e.g., via a function interface) that maps source periods to destination periods based on the thirteenth day of the source period.

At step 512, the system determines whether the mapping type of a selected mapping is many-to-one (e.g., daily to monthly) or one-to-many (e.g., monthly to weekly). If the mapping type is many-to-one, the system determines the beginning date of the first destination period based on the beginning date of the first source period (step 515). In some embodiments, the beginning date of the first destination period may be determined based on factors such as those discussed above with respect to step 415 of process 400.

At step 518, the system maps one or more source periods to the first destination period. For example, if the mapping performed is a weekly-to-monthly mapping, the system may map any weekly periods in the source period stream falling within the first destination month to the first destination monthly period. The mapping may be performed based in part on rules determined at step 509. For example, if the mapping is subject to a BOP mapping rule, a source period falling within two destination periods may be mapped to the destination period with which its first day overlaps. If the mapping is subject to an EOP mapping rule, the overlapping source period may be mapped to the destination period with which its last day overlaps. The system maps any source periods falling within the first destination period to the first destination period in accordance with any applicable mapping rules.

At step 521, the system determines whether the ending date of the last mapped source period and/or destination period is on or beyond an ending date for the mapping. If so, the mapping is completed and the system outputs (e.g., stores in memory, displays to user, transmits to a calling program, etc.) the period stream mapping (step 527). If the ending date of the last mapped period is not on or beyond the end date for the mapping, the system determines the beginning date of the next destination period (step 524) and maps the next set of source periods to the next destination period (step 518). Steps 518, 521, and/or 524 may be repeated until the period stream (s) meet or exceed the desired end date for the mapping.

If the mapping type is determined to be one-to-many at step 512, the system determines the beginning date of the first destination period based on the beginning date of the first source period (step 530). At step 533, the system maps the first source period to one or more destination periods. The mapping may be performed based in part on rules determined at step 509. In one embodiment, if the mapping is subject to a BOP mapping rule, a source period falling within two destination periods may be mapped to the destination period with which its first day overlaps. If the mapping is subject to an EOP mapping rule, the overlapping source period may be mapped to the destination period with which its last day overlaps. For example, for a monthly-to-weekly mapping, a monthly source period that overlaps with two destination weeks may be mapped to the earlier week under a BOP mapping rule and to the later week under an EOP mapping rule.

At step 536, the system determines whether the ending date of the last mapped source period and/or destination period is on or beyond the ending date for the mapping. If so, the mapping is completed and the system outputs the period stream mapping (step 527). If the ending date of the last mapped period is not on or beyond the end date for the mapping, the system determines the beginning date of the next destination period (step 539) and maps the next source period to the next set (e.g., one or more) of destination periods (step 533). Steps 533, 536, and/or 539 may be repeated until the period stream(s) meet or exceed the desired end date for the mapping.

Referring now to FIG. 5B, an illustration of a user interface 550 that may be used (e.g., in a configuration mode) in mapping a source period to a destination period is shown according to an exemplary embodiment. In various embodiments, features and/or options shown in user interface 550 may be defined and/or selected by a program (e.g., using function calls) via a function interface. User interface 550 includes a map type column 552, a source type column 554, a destination type column 556, a mapping rule column 558, and a description column 560. Map type column 552 includes an identifier for each mapping type defined in user interface 550. Source type column 554 shows the period type of the source period for each mapping type, and destination type column 556 shows the period type of the destination period for each mapping type. Mapping rule column 558 displays any mapping rules that apply to each mapping type. Description column 560 displays a description (e.g., text description) of each mapping type.

User interface 550 displays several mapping types, M1, M3 and M4, for which the source and destination period types are the same and no mapping is required. The other mapping types shown in user interface 550 have different source and destination period types and require mapping. One mapping type (M5) has been assigned a BOP mapping rule and others (M6 and M7) have been assigned an EOP mapping rule. M5 and M6 have been defined using the same source and destination period types, but with different mapping rules.

Figure 5C:
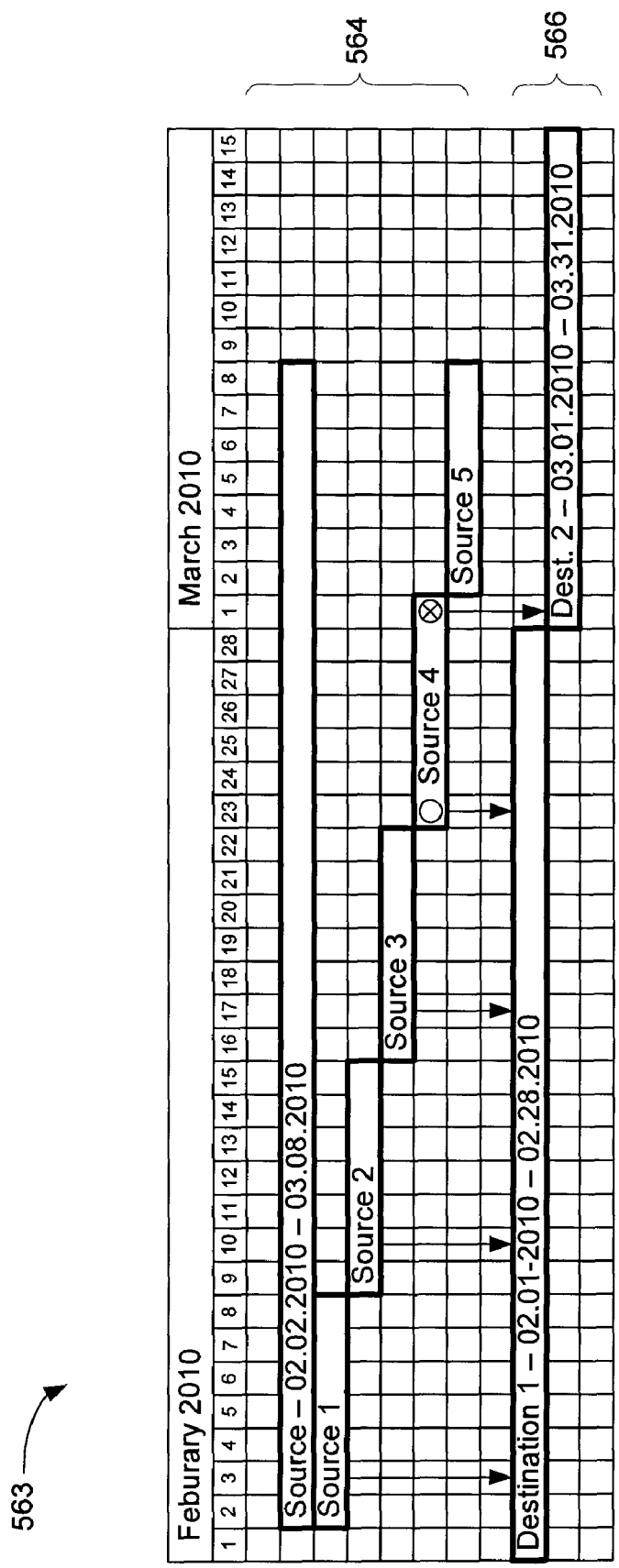
FIG. 5C is a chart illustrating the relationship between source periods and destination periods according to an exemplary embodiment.

Referring now to FIG. 5C, a time-based bar chart 563 showing the duration and/or mapping of different source and destination periods is provided according to an exemplary embodiment. Chart 563 illustrates a weekly source period stream including five weekly source periods. The mapping illustrated in chart 563 is a weekly-to-monthly mapping.

Chart 563 illustrates the differing results of applying a BOP mapping rule and an EOP mapping rule. The open circle shown in source period 4 is associated with mapping type M5 shown in user interface 550, which is subject to BOP mapping, and the crossed-through circle in source period 4 is associated with mapping type M6, which is subject to EOP mapping. Source period 4 extends from Feb. 23, 2010 through Mar. 1, 2010 and, accordingly, overlaps with two monthly destination periods. Under BOP mapping, source period 4 is mapped to destination period 1 (i.e., the February destination period). Under EOP mapping, source period 4 is mapped to destination period 2 (i.e., the March destination period).

FIGS. 5D through 5F are tables illustrating mapping of periods from a source period type to a destination period type according to exemplary embodiments. FIG. 5D includes a table 570 that illustrates mappings that may result from a weekly-to-monthly mapping subject to an EOP mapping rule (e.g., mapping type M6 shown in user interface 550). Columns 582 and 584 show the beginning and ending dates, respectively, of each source period. Columns 586 and 588 show the beginning and ending dates, respectively, of each destination period to which the source periods are mapped. FIG. 5E includes a table 575 that illustrates mappings that may result from a weekly-to-monthly mapping subject to a BOP mapping rule (e.g., mapping type M5 shown in user interface 550). FIG. 5F includes a table 580 that illustrates mappings that may result from a 2-weekly-to-monthly mapping subject to an EOP mapping rule (e.g., mapping type M7 shown in user interface 550).

Figure 6A:
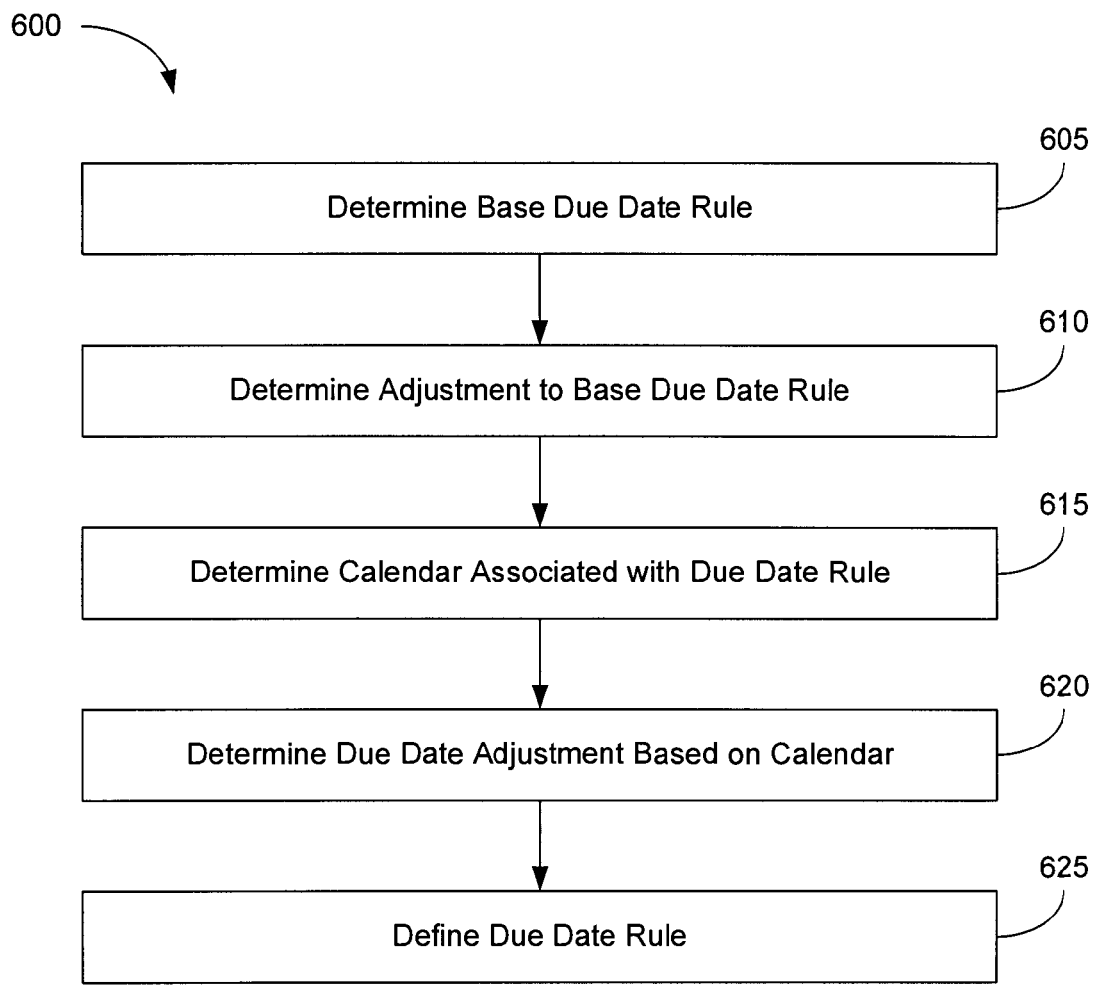
FIG. 6A is a flow diagram of a process for defining a due date rule according to an exemplary embodiment.

Referring now to FIG. 6A, a flow diagram of a process 600 for defining a due date rule is shown according to an exemplary embodiment. In some embodiment, process 600 may be executed on a system such as system 100 and/or a module such as due date generation module 130. Due date rules may be used to generate due dates that may be associated with periods and/or period streams to indicate a time at which a particular action should occur. For example, in a payment system, a due date may be associated with periods in a payment period stream and may indicate when a payment should be made. In some embodiments, due date rules generated using process 600 may be associated with any type of period or period stream. In other embodiments, one or more due date rules may be defined as applying only to one or more specific period types.

At step 605, the system may determine a base due date rule to apply to the due date rule. The base due date rule may specify a portion of a period at which, absent further modification, a due date will occur. For example, one exemplary type of base due date rule (a beginning of period ("BOP") base due date rule) may cause the due date to occur on the first day of each period to which it is applied. Another exemplary type of base due date rule (an ending of period ("EOP") base due date rule) may cause the due date to occur on the last day of each period to which it is applied. In other embodiments, any other type of base due date rule may be defined and/or applied. For example, in various embodiments, a base due date rule may dictate that a due date occur on the second Wednesday of each monthly period, the fourteenth day of the third month of each quarterly period, etc. In some embodiments, a program and/or user may be enabled (e.g., via a function interface) to define custom base due date rules.

At step 610, the system may determine an adjustment factor to the base due date rule. In some embodiments, the adjustment may be defined according to a time (e.g., number of days) in advance of or after the due date established under the base due date rule that the due date should occur. For example, in one embodiment, an adjustment factor of twelve may be applied to the due date rule indicating that the due date should occur twelve days after the date on which it would have occurred under the base due date rule (e.g., twelve days after the first date of the period under a BOP base rule). In another embodiment, an adjustment factor of negative four may be applied to the due date rule indicating that the due date should occur four days before the date on which it would have occurred under the base rule (e.g., four days before the last date of the period under an EOP base rule). Such an adjustment may be made, for example, to allow time for a bank to transfer funds.

At step 615, the system may determine a one or more calendars that may be referenced in applying the due date rule. Calendars may include a country-specific calendar including information relating to national holidays and/or events, a region-specific calendar including information relating to regional holidays and/or events, a company-specific calendar including information relating to company holidays, events, and/or business and non-business days, a business unit-specific calendar including information relating to business unit holidays, events, and/or business and non-business days, a factory calendar including information relating to factory holidays, events, business and non-business days, and/or scheduled downtimes, one or more personal calendars including information relating to the availability and/or conflicts of one or more individuals, or any other type of calendar.

If a calendar is associated with the due date rule, the due date determined according to the base due date rule and/or adjustment may be checked against the calendar. If there is a conflict (e.g., the due date falls on a special day such as a holiday or other non-business day), the due date rule may be designed to take a remedial action or calendar adjustment (step 620). A calendar adjustment rule may be specified that determines what action should be taken in the event the due date falls on a special day under the calendar. One exemplary calendar adjustment rule may dictate that the due date be moved to the next normal business day. Another exemplary calendar adjustment rule may dictate that the due date be moved back to the normal business day immediately preceding the conflicted day. Another exemplary calendar rule may cause the due date to be moved forward or backward by a predefined number of days. Various other calendar rules may be applied in other exemplary embodiments, and all such variations are within the scope of the present disclosure. At step 625, the due date rule is defined based on the base due date rule, adjustment factor, calendar, and/or calendar adjustment rule. The due date rule may be applied (e.g., by a user) to one or more periods and/or period streams to determine an associated due date.

Referring now to FIG. 6B, an illustration of a user interface 628 that may be used (e.g., in a configuration mode) defining one or more due date rules is provided according to an exemplary embodiment. In various embodiments, features and/or options shown in user interface 550 may be defined and/or selected by a program (e.g., using function calls) via a function interface. User interface 628 includes a due date rule column 630, a period type column 632, a base rule column 634, an adjustment factor column 636, a calendar column 638, a calendar adjustment rule column 640, and a description column 642. Due date rule column 630 shows an identifier for each due date rule defined in user interface 628. Period type column 632 displays period types with which each rule may be associated and/or applied. Base rule column 634 shows base due date rules (e.g., BOP base rule, EOP base rule, etc.) that apply to each due date rule. Adjustment factor column 636 shows adjustment factors, if any, that should be applied to the base rule for each due date rule. Calendar column 638 illustrates calendars, if any, that should be considered in applying each due date rule. Calendar adjustment rule column 640 shows a calendar adjustment rule (e.g., move forward, move back, etc.) that should be applied in the event the due date falls on a special day under a calendar that is applied to the due date rule. Description column 642 includes a description relating to each due date rule.

User interface 628 includes due date rules having several different types of base rules. Rules DD1, DD3, DD5, and DD7 are associated with BOP base rules, while rules DD2, DD4, DD6, and DD8 are associated with EOP base rules. Rule DD9 is associated with a custom base rule that causes the due date for any monthly period to which it is applied to occur on the Wednesday of the second week of the following month.

User interface 628 also includes four due date rules, DD3 through DD5 and DD7, that determine due dates with reference to a calendar. Each of the four due date rules displayed includes a calendar adjustment rule that causes the due date to be moved forward to the next business day in the event the due date falls on a special day as defined in the calendar data.

Figure 6C:
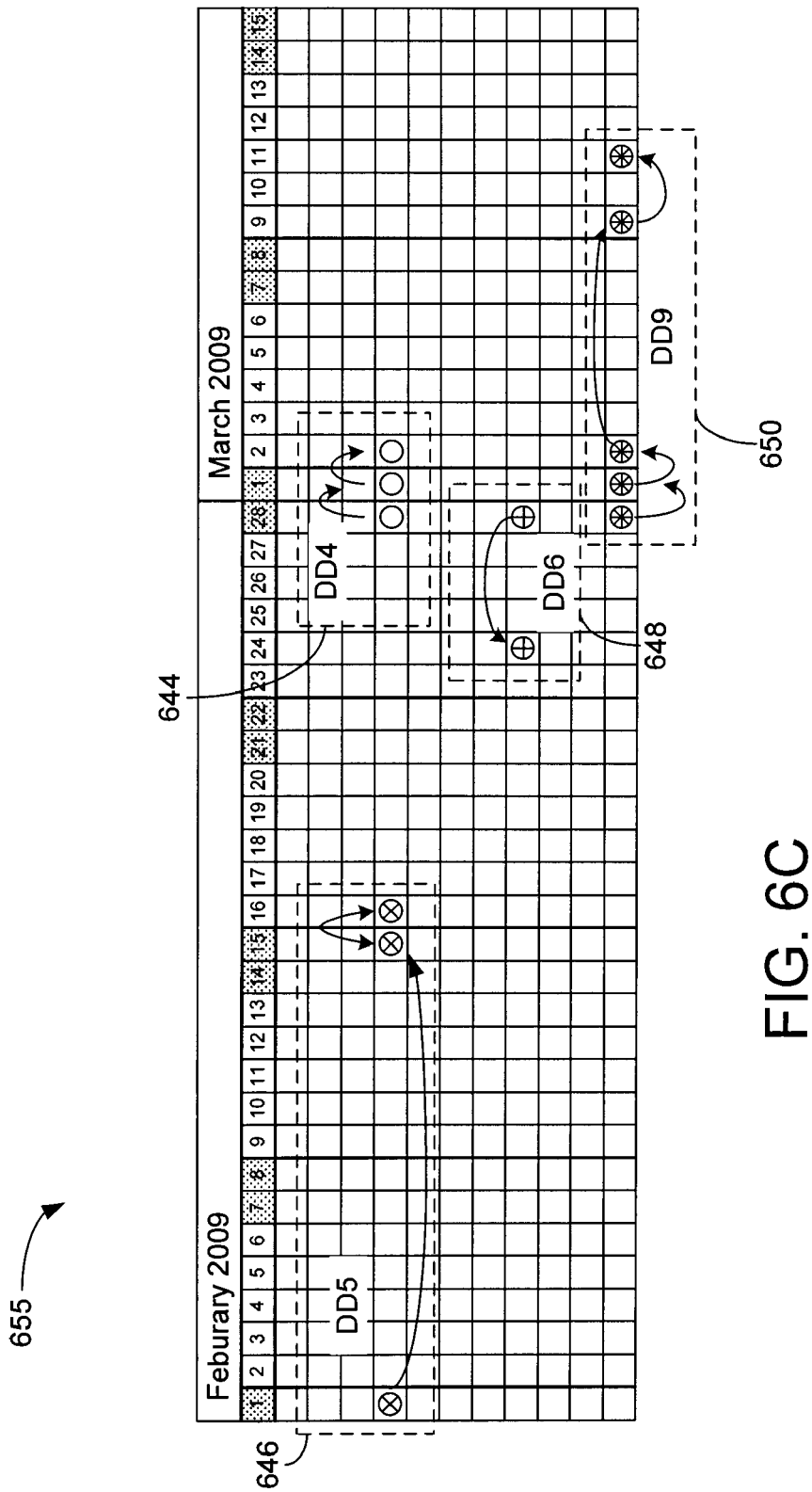
FIG. 6C is a chart illustrating due dates determined based on several different due date rules according to an exemplary embodiment.

Referring now to FIG. 6C, a chart 655 illustrating due dates determined based on several different due date rules is shown according to an exemplary embodiment. Chart 655 illustrates the determination of exemplary due dates according to rules DD4, DD5, DD6, and DD9 shown in user interface 628. As shown in chart 655 at box 644, due date rule DD4 is applied to a monthly period occurring in February 2009. An EOP base rule is assigned to rule DD4, so the due date based on the base rule occurs on the last day of the period, which is Feb. 28, 2009. Rule DD4 references calendar data, and the calendar indicates that Feb. 28, 2009 is a special and/or non-business day (indicated by shading of the date in the heading). The calendar adjustment rule associated with rule DD4 indicates that the due date should be moved forward to the next normal business day, so the due date is moved forward and set on Mar. 2, 2009.

Rule DD5, the effect of which is shown in box 646, includes a BOP base rule with a fourteen day adjustment factor. Applied to the monthly period occurring in February 2009, the due date begins on the first day of the period, Feb. 1, 2009, according to the base rule. The due date is then moved fourteen days forward to Feb. 15, 2009, in accordance with the adjustment factor. Rule DD5 also references the calendar, and Feb. 15, 2009 is a special day under the calendar. In accordance with the calendar adjustment rule of due date rule DD5, the due date is moved forward to the next normal day under the calendar, Feb. 16, 2009.

Rule DD6, the effect of which is shown in box 648, includes an EOP base rule with a negative four day adjustment factor. Applied to the monthly period occurring in February 2009, the due date begins on the last day of the period, Feb. 28, 2009, according to the base rule. The due date is then moved four days backward to Feb. 24, 2009. Rule DD6 does not reference the calendar, so no further due date adjustment is made.

Rule DD9, the effect of which is shown in box 650, includes a custom base rule that dictates that the due date be set on the Wednesday of the second week of the following month. Applied to the monthly period occurring in February 2009, the due date begins on the last day of the period and is shifted forward into March, into the second week of March, and into the Wednesday of that week (Mar. 11, 2009), according to the custom base rule. No adjustment factors or calendars apply to rule DD9, so the due date is set at Mar. 11, 2009.

Referring now to FIG. 6D, a table 660 illustrating mapping of periods from a source period to a destination period and due dates determined based on one due date rule is shown according to an exemplary embodiment. Columns 662 and 664 show beginning and ending dates, respectively of each mapped source period. Columns 666 and 668 show beginning and ending dates, respectively, of each mapped destination period. Column 670 lists due dates associated with each destination period. The mapping data shown in table 660 is based on a weekly-to-monthly mapping using an EOP mapping rule. The due dates shown in table 660 are based on a due date rule having an EOP base rule and an adjustment factor of negative four days. The due date rule also references a country and region specific calendar and applies a calendar adjustment rule that moves due dates ahead to the next business day in event of a conflict.

The embodiments of the present disclosure have been described with reference to drawings. The drawings illustrate certain details of specific embodiments that implement the systems and methods and programs of the present disclosure. However, describing the invention with drawings should not be construed as imposing any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hard-wired system.

As noted above, embodiments within the scope of the present disclosure include program products comprising machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium (e.g., non-transitory medium) which may be used to carry or store desired program code in the form of machine-executable instructions or data structures and which may be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present disclosure have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present disclosure may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a general purpose computing computers in the form of computers, including a processing unit, a system memory or database, and a system bus that couples various system components including the system memory to the processing unit. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer.

It should also be noted that the word "terminal" as used herein is intended to encompass computer input and output devices. User interfaces, as described herein may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure. Such variations will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments of the disclosure has been presented for purposes of illustration and description. It is not intended to be exhaustive or limiting to the precise form disclosed, and modifications and variations are possible in light of the above teachings or may be acquired from practice. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure.

Throughout the specification, numerous advantages of the exemplary embodiments have been identified. It will be understood of course that it is possible to employ the teachings herein without necessarily achieving the same advantages. Additionally, although many features have been described in the context of a particular data processing unit, it will be appreciated that such features could also be implemented in the context of other hardware configurations.

The exemplary embodiments illustrated in the figures and described above are offered by way of example only. Other embodiments may include, for example, structures with different data mapping or different data. The disclosure is not limited to a particular embodiment, but extends to various modifications, combinations, and permutations that nevertheless fall within the scope and spirit of the appended claims.

What is claimed is:

1. A method of generating time periods and due dates, the method comprising:
   providing a period toolset that is accessible by a calling program to perform a plurality of functions, the functions being performed during runtime of the calling program, the period toolset and the calling program being implemented via instructions that are executable by one or more processors and stored on one or more non-transitory computer-readable media, the functions including defining, using a period generation module, a plurality of period types based on a period duration selected by the calling program, the period generation module being implemented via instructions that are executable by the one or more processors and stored on the one or more non-transitory computer-readable media;

generating, using the period generation module, a first period stream based on one of the period types, wherein the first period stream is based on a beginning date and an ending date selected by the calling program, wherein the first period stream is a group of periods occurring between the beginning date and the ending date of the first period stream;

mapping, using a period mapping module, the first period stream to a second period stream based on one or more mapping rules selected by the calling program, wherein mapping the first period stream to the second period stream comprises mapping each period of the first period stream to at least one period of the second period stream, wherein at least one of the one or more mapping rules determines a period of the second period stream to which an overlapping period of the first period stream should be mapped when the overlapping period overlaps two periods of the second period stream, the period mapping module being implemented via instructions that are executable by the one or more processors and stored on the one or more non-transitory computer-readable media; and determining, using a due date generation module, a due date for one or more periods of at least one of the first period stream and the second period stream based on one or more due date rules selected by the calling program, wherein the one or more due date rules are configured to determine a date on which a due date will occur for each period to which the due date rule is applied, the due date generation module being implemented via instructions that are executable by the one or more processors and stored on the one or more non-transitory computer-readable media.

2. The method of claim 1, wherein each of the period types is associated with an application type with which the period type may be used.

3. The method of claim 1, wherein generating the first period stream comprises adding periods to the first period stream until an ending date of a last period is on or beyond the ending date of the first period stream.

4. The method of claim 1, wherein one of the mapping rules causes the overlapping period of the first period stream to be mapped to a period of the second period stream that overlaps a first day of the first period stream.

5. The method of claim 1, wherein one of the mapping rules causes the overlapping period of the first period stream to be mapped to a period of the second period stream that overlaps a last day of the first period stream.

6. The method of claim 1, wherein at least one of the one or more due date rules comprises a base due date rule configured to set the due date on at least one of a first day of each period or a last day of each period.

7. The method of claim 6, wherein the at least one due date rule that comprises a base due date rule further comprises an adjustment factor configured to move the due date from a date determined according to the base due date rule by a predetermined number of days.

8. The method of claim 1, wherein at least one of the one or more due date rules is configured to determine the due date based on calendar data, wherein the calendar data includes a plurality of special dates, wherein the due date rule is configured to move the due date when the determined date on which the due date will occur is one of the plurality of special dates.

9. A system for generating time periods and due dates, the system comprising:
one or more processors, and
one or more non-transitory computer-readable media having instructions stored thereon, the instructions being executable by the one or more processors to implement a period toolset, the period toolset being accessible by a calling program to enable the calling program to
define a plurality of period types based on a period duration selected by the calling program,
generate a first period stream based on one of the period types, wherein the first period stream is based on a beginning date and an ending date selected by the calling program, wherein the first period stream is a group of periods occurring between the beginning date and the ending date of the first period stream,
map the first period stream to a second period stream based on one or more mapping rules selected by the calling program, wherein mapping the first period stream to the second period stream comprises mapping each period of the first period stream to at least one period of the second period stream, wherein at least one of the one or more mapping rules determines a period of the second period stream to which an overlapping period of the first period stream should be mapped when the overlapping period overlaps two periods of the second period stream,
define at least one due date rule configured to determine a date on which a due date will occur for each period to which the due date rule is applied, and
apply the due date rule to a period stream to determine a due date for each period associated with the period stream
wherein the period toolset is configured to enable the calling program to define the plurality of period types, generate the first period stream, map the first period stream to the second period stream, define the due date rule, and apply the due date rule to a period stream during runtime of the calling program.

10. The system of claim 9, wherein each of the period types is associated with an application type with which the period type may be used.

11. The system of claim 9, wherein generating the first period stream comprises adding periods to the first period stream until an ending date of a last period is on or beyond the ending date of the first period stream.

12. The system of claim 9, wherein one of the mapping rules causes the overlapping period of the first period stream to be mapped to a period of the second period stream that overlaps a first day of the first period stream.

13. The system of claim 9, wherein one of the mapping rules causes the overlapping period of the first period stream to be mapped to a period of the second period stream that overlaps a last day of the first period stream.

14. The system of claim 9, wherein the due date rule comprises a base due date rule configured to set the due date on at least one of a first day of each period or a last day of each period.

15. The system of claim 14, wherein the due date rule further comprises an adjustment factor configured to move the due date from a date determined according to the base due date rule by a predetermined number of days.

16. The system of claim 9, wherein the due date rule is configured to determine the due date based on calendar data, wherein the calendar data includes a plurality of special dates, wherein the due date rule is configured to move the due date when the determined date on which the due date will occur is one of the plurality of special dates.

17. A program product comprising one or more non-transitory computer-readable media having instructions stored thereon, the instructions being executable by one or more processors to implement a method of generating time periods and due dates, the method comprising:

providing a period toolset that is accessible by a calling program to perform a plurality of functions, the functions being performed during runtime of the calling program, the period toolset and the calling program being implemented via instructions that are executable by one or more processors and stored on one or more computer-readable media, the functions including defining a plurality of period types based on a period duration selected by the calling program, generating a first period stream based on one of the period types, wherein the first period stream is based on a beginning date and an ending date selected by the calling program, wherein the first period stream is a group of periods occurring between the beginning date and the ending date of the first period stream, mapping the first period stream to a second period stream based on one or more mapping rules selected by the calling program, wherein mapping the first period stream to the second period stream comprises mapping each period of the first period stream to at least one period of the second period stream, wherein at least one of the one or more mapping rules determines a period of the second period stream to which an overlapping period of the first period stream should be mapped when the overlapping period overlaps two periods of the second period stream, wherein a first mapping rule causes the overlapping period of the first period stream to be mapped to a period of the second period stream that overlaps a first day of the overlapping period, wherein a second mapping rule causes the overlapping period of the first period stream to be mapped to a period of the second period stream that overlaps a last day of the overlapping period, wherein the period toolset is configured to enable the calling program to select one of the first mapping rule and the second mapping rule to apply in mapping the first period stream to the second period stream, defining one or more due date rules configured to determine a date on which a due date will occur for each period to which the due date rule is applied, wherein the period toolset is configured to enable the calling program to associate at least one of the one or more due date rules with a calendar, wherein the calendar includes a plurality of special dates, wherein the due date rule is configured to move the due date when the determined date on which the due date will occur is one of the plurality of special dates, and applying the due date rule to a period stream to determine a due date for each period associated with the period stream.

18. The program product of claim 17, wherein generating a first period stream comprises adding periods to the first period stream until an ending date of a last period is on or beyond the ending date of the first period stream.

19. The program product of claim 17, wherein at least one of the one or more due date rules comprises a base due date rule configured to set the due date on at least one of a first day of each period or a last day of each period.

20. The program product of claim 19, wherein the at least one due date rule that comprises a base due date rule further comprises an adjustment factor configured to move the due date from a date determined according to the base due date rule by a predetermined number of days.

* * * * *